United States Patent
Hänsel et al.

[11] Patent Number: 5,879,033
[45] Date of Patent: Mar. 9, 1999

[54] HOSE CONNECTOR

[75] Inventors: Mathias Hänsel, Rümmingen; Udo Herberg, Lörrach; Michael Trede, Rixheim, all of Germany

[73] Assignee: A. Raymond & Cie, France

[21] Appl. No.: 984,873

[22] Filed: Dec. 4, 1997

[30] Foreign Application Priority Data

Dec. 6, 1996 [DE] Germany .................. 196 50 601.8

[51] Int. Cl.$^6$ ............................................. F16L 33/00
[52] U.S. Cl. ............................................. 285/239; 285/247
[58] Field of Search ................. 285/239, 256, 285/259, 347, 240–255, 257, 258

[56] References Cited

U.S. PATENT DOCUMENTS

| | | | |
|---|---|---|---|
| 585,014 | 6/1897 | Wenzel et al. | 285/239 |
| 4,593,942 | 6/1986 | Loker | 285/259 X |
| 5,096,231 | 3/1992 | Chisnell | 285/256 X |
| 5,470,113 | 11/1995 | Schwalm et al. | 285/259 X |
| 5,511,827 | 4/1996 | Steinkamp et al. | 285/39 |

*Primary Examiner*—Dave W. Arola
*Attorney, Agent, or Firm*—Gifford, Krass, Groh, Sprinkle, Anderson & Citkowski, P.C.

[57] ABSTRACT

The present connector for liquid-conducting, plug-type connections consists of a hose nipple (2) formed on the coupling (1) and pluggable into the connecting end of a flexible plastic hose (3). The nipple has at its free end a conically widening, beveled plug edge (4) and an adjoining cylindrical shaft portion (5) with several truncated expansions (6) and (7), as well as an annular contact flange (8) at the end of the plug-in area (E) portion. The back side of the first truncated expansion portion (6) has a conical taper portion (9). Between the expansion portion (6) and the taper portion (9) an encircling groove (10) is provided, in which is embedded a gasket ring (11) circular in cross section. In order that the end of the hose or tube can be easily slipped over the nipple and the gasket ring, the surface (M1) of the first truncated expansion portion (6) outwardly at an angle α of about 45° in relation to the surface of the shaft (5) and is oriented so as to provide a slight clearance (a) past the outer surface (14) of the gasket ring (11). The surface (M2) of the succeeding taper portion (9) has a significantly flatter angle of inclination β of about 20°–30° in relation to the surface area of the shaft (5) and its rearward projection is tangent to the outer surface (14) of the gasket ring.

4 Claims, 1 Drawing Sheet

HOSE CONNECTOR

BACKGROUND OF THE INVENTION

The invention pertains to a connector for liquid-conducting, plug-type connections and especially to a tube or hose nipple formed on a coupling, which can be plugged into the connecting end of a tube or hose of semi-flexible plastic.

Such hose connectors normally have on their free end a conically widening beveled plug edge and an adjoining cylindrical shaft with several truncated expansions, as well as an annular contact flange at the end of the plug-in area. Here the diameter of the shaft is slightly greater than the inner diameter of the plastic tube, so that the elastically expandable plastic tube fits flush against the shaft once the nipple is plugged in and the truncated expansions dig slightly into the interior wall of the tube such as disclosed in German Patent No. DE 4,413,346 C2.

In order to achieve a better fit of the tube on the connector, tube or hose nipples are already in use, with a conical taper at the back side of the first truncated expansion and an encircling groove between the expansion and the taper, in which is embedded an annular gasket ring round in cross section.

The objective of the invention is to design the connector with its truncated expansion and taper in such a way that the end of the hose or tube can be slipped over the gasket ring without stressing or even slightly damaging the latter with its sharp leading edge.

SUMMARY OF THE INVENTION

This objective is realized according to the present invention in that the surface area of the first truncated expansion has an opening angle α of about 45° in relation to the surface of the shaft and is oriented so as to provide a slight clearance past the outer surface of the gasket ring, while the surface area of the succeeding taper has a significantly flatter angle of inclination β of about 20°–30° in relation to the surface area of the tube and its rearward projection is tangent to the outer surface.

In a further embodiment of the invention, it is especially advantageous for connecting the end of the tube or hose when the length of the shaft section up to the first expansion corresponds approximately to the diameter of the shaft. On the one hand, this ensures an optimal support effect on the cylindrical shaft section, and on the other hand, prevents fuel flowing through the plug-type connection from coming into contact with the gasket ring, so that the latter cannot be corroded away by the known aggressive fuel over the course of time.

BRIEF DESCRIPTION OF THE DRAWINGS

Additional characteristics of the invention are contained in the subordinate claims and in the following description of an embodiment example illustrated in the appended drawing. Shown are

DETAILED DESCRIPTION OF THE PREFERRED EMBODIMENT

Figure 1:
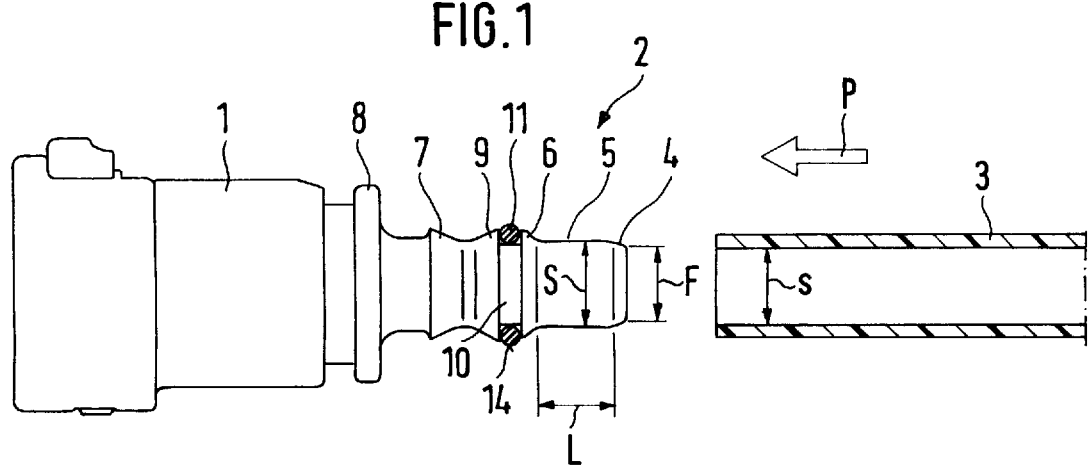
FIG. 1 shows a side view of a coupling with a hose nipple formed on it and an associated pressure hose insertion prior to their engagement.

A tube or hose nipple (2) depicted in FIG. 1 is formed in one piece with the coupling (1) of a plug-type connection and is intended to be plugged into the connecting end of a semi-flexible plastic tube (3) and absolutely sealed inside the latter for this purpose, the nipple (2) has at its free end a conically widening. The beveled plug edge (4) and an adjoining cylindrical shaft (5) with several truncated or Frusto-conical expansion portions (6) and (7), as well as an annular contact flange (8) at the end of the insertion area (E).

At the back side of the truncated expansion (6) is a frusto conical taper portion (9). At the transition from the expansion (6) to the taper portion (9) there is a groove (IO) for receiving and embedding a gasket ring (11) having a circular cross section, which is preferably made of a rubber-like material.

The beveled plug edge (4) has a front diameter (F) which is slightly greater than the inner diameter (s) of the plastic tube (3), so that the latter must expand to the diameter (S) of the shaft when slipped onto the nipple in the direction of the arrow (f). The section of the shaft (t) extending to the first expansion portion (6) should be very flat and its length (L) should approximate the diameter (S) of the shaft.

Figure 3:
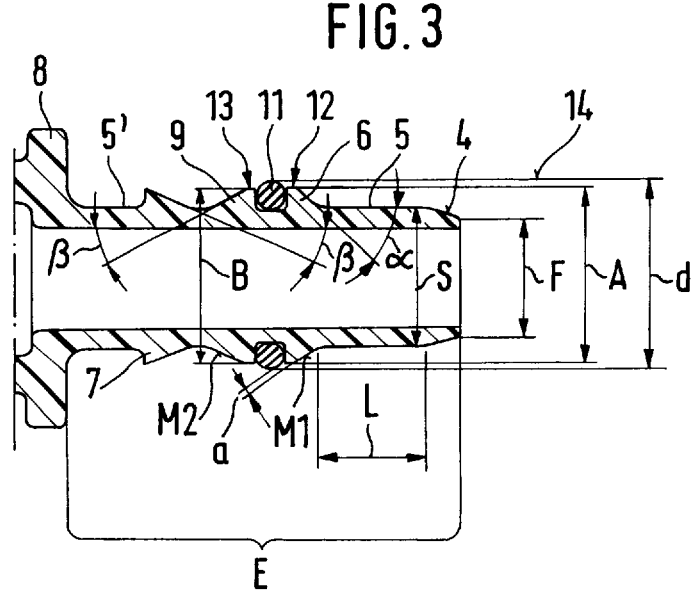
FIG. 3 shows a partial enlarged depiction of the hose nipple in longitudinal section.

As can be seen in FIG. 3, the surface (M1) of the truncated expansion portion (6) increases the opening at an angle of 40°, preferably by 46°, in relation to the surface of the shaft (5) clears the outer surface (14) of the gasket ring (11) at a slight separation (a). The expansion (6) has a flat cylindrical area (12) directly in front of the grove (10) the outer diameter (A) of which is slightly smaller than the outer diameter (d) of the gasket ring (11).

On the other hand, the surface (M2) of the succeeding taper portion (9) has a flatter angle of inclination (b) in relation to the surface of the shaft (5), which is about 20°–30°, A rearward projection of the surface (M2) is tangent to the outer surface (14) of the gasket ring (11) or even slightly "cuts" the latter. The conical taper portion (9) also has a rounded edge (13) immediately behind the groove (10), the outer diameter (B) of which is preferably smaller by some 0.2–0.4 mm than the outer diameter (A) of the flattened cylindrical area (12).

Figure 2:
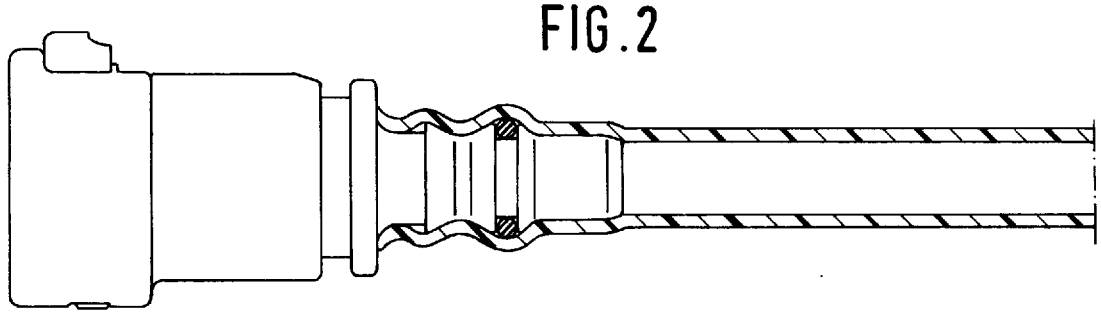
FIG. 2 shows the same view with the hose engaged on the nipple.

As a result of the aforesaid geometry of the expansion (6) and the taper (9), particularly favorable conditions are established for slipping the connecting end of the plastic tube (3) over the gasket ring (11) and the following expansion portion (7) to the contact flange (8) (FIG. 2).

It goes without saying that the geometry of the tube or hose nipple (2) of the invention can be used in the same manner with an insertion part not shown in the drawings, which works together with the coupling (1) in the plug-type connection described in the preamble.

We claim:

1. A connector adapted for insertion into a flexible plastic hose, said connector comprising a gasket ring having an outer surface, a nipple having a beveled free end, and a contact flange, said nipple further having a cylindrical shaft portion extending from said free end to a truncated expansion portion, said nipple further having a tapered portion and an annular groove positioned between said expansion portion and said tapered portion; said gasket ring positioned in said angular grove, said truncated expansion portion having a surface angling outwardly from said shaft at an angle in the range of between 40°–46°, such that an outward projection of said surface freely clears said outer surface of said ring, said tapered portion having a surface angling inwardly from said annular groove at an angle generally in the range of 20°–30° such that a projection of the surface is tangent to said outer surface of said ring.

2. The connector of claim 1, wherein said shaft portion has a predetermined outer diameter generally equal to a predetermining length between said free end and said expansion portion.

3. The connector according to claim 1, wherein said outer surface of said ring has a predetermined diameter and said truncated expansion has a cylindrical portion extending between said annular groove and said angled surface, said cylindrical portion having a predetermined diameter less than the diameter of said outer surface of said ring.

4. The connector according to claim 1 wherein said tapered portion further comprises a rounded edge extending between said annular groove and said surface of said tapered portion, said rounded edge having an outer diameter which is smaller than the diameter of the cylindrical portion by an amount in the range of 0.2 to 0.4 mm.

* * * * *

UNITED STATES PATENT AND TRADEMARK OFFICE
CERTIFICATE OF CORRECTION

PATENT NO. : 5,879,033

DATED : March 9, 1999

INVENTOR(S) : Mathias Hansel, Udo Herberg and Michael Trede

It is certified that error appears in the above-identified patent and that said Letters Patent is hereby corrected as shown below:

Column 2, line 3, delete ", the" and insert --. The--.
Column 2, line 4, delete "widening. The" and insert --widening, beveled--.
Column 2, line 8, delete "frusto conical" and insert --frusto-conical--.
Column 2, line 10, delete "I0" and insert --10--.
Column 2, lines 16-17, delete "in the direction of the arrow (f)" and insert --(2) in the direction of the arrow (P)--.
Column 2, line 18, delete "(t)" and insert --(5)--.
Column 2, line 23, before "clears", insert --. The expansion portion is positioned so that an extension of the surface (MI) of the expansion portion (6).--.
Column 2, line 25, after "(10)" insert --,--.
Column 2, line 31, delete ", A" and insert --. A--.

Signed and Sealed this

Twenty-first Day of September, 1999

Attest:

Q. TODD DICKINSON

*Attesting Officer*         *Acting Commissioner of Patents and Trademarks*